Dec. 24, 1929.   R. G. STALLARD   1,740,910
PIPE UNION
Filed April 8, 1926
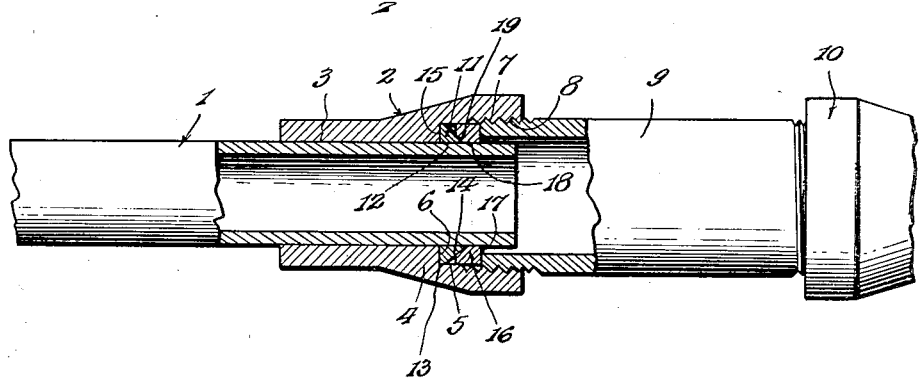
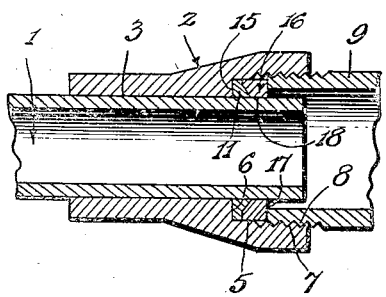 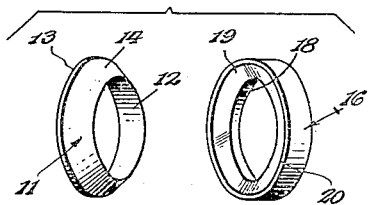
Inventor
R. G. Stallard.
By Lacey & Lacey, Attorneys Patented Dec. 24, 1929

1,740,910

UNITED STATES PATENT OFFICE

ROSWELL G. STALLARD, OF CENTRALIA, WASHINGTON

PIPE UNION

Application filed April 8, 1926. Serial No. 100,632.

This invention relates to improvements in threadless pipe unions and has as its general object to provide a union by the use of which, in connection with a nipple, or bushing, a firm connection may be made between the sections of a pipe or the adjacent ends of two pipes capable of withstanding high pressure without any likelihood of leakage.

Another object of the invention is to provide a pipe union which may be readily fitted to the pipes to be connected without the necessity of in any way acting upon the pipe ends to adapt the union to be fitted thereto.

Another object of the invention is to provide a pipe union embodying a compressible gasket and means for compressing and distorting the gasket to cause the same to bind about the pipe ends in a water-tight manner at the time the union is applied, the said gasket being of metal as distinguished from the gasket usually employed in such unions.

In the accompanying drawings:

Figure 1 is a vertical longitudinal sectional view through the union embodying the invention, the parts comprising the same being shown assembled but not adjusted to the extent to seal the union.

Figure 2 is a similar view illustrating the parts so adjusted and the union sealed.

Figure 3 is a group perspective view illustrating the gasket and the compression ring associated therewith.

In the drawings, the numeral 1 indicates one pipe end which is to be coupled with another pipe end, (not shown), and the numeral 2 indicates the union embodying the invention, the said union comprising a sleeve having a bore 3 which is cylindrical and smooth and of a diameter to snugly receive the pipe 1. The sleeve comprising the union is exteriorly flared in the direction of one end, as indicated by the numeral 4, and at this end the bore 3 is enlarged to cylindrical form as indicated by the numeral 5, thus providing a shoulder which is indicated by the numeral 6, the shoulder extending circumferentially within the bore between the portion of the length of the bore which accommodates the pipe 1 and the enlargement of the bore, and the said shoulder being flat. The wall of the bore at the enlarged portion 5 is smooth and cylindrical but beyond this portion or between the same and the enlarged end of the sleeve, the bore is interiorly threaded as indicated by the numeral 7, so as to accommodate the threaded end 8 of a nipple 9 which constitutes a connection between two of the unions, the companion union being indicated in the drawings by the numeral 10 and corresponding in every respect to the union 2.

The numeral 11 indicates a gasket which is of annular form and has a cylindrical opening 12, and this gasket is of lead or other relatively soft metal and is preferably provided with a cylindrical peripheral portion 13 and a beveled or conical peripheral portion 14, the surface 14 meeting the wall of the opening 12 at one face of the gasket. The opening 12 is of a diameter to adapt the gasket to be readily fitted over the end portion of the pipe 1, and the other face 15 of the gasket is flat so as to be disposable against the shoulder 6. As shown in Figure 1 of the drawings, the union 2 is fitted onto the pipe end and the gasket 11 is, in turn, fitted onto the pipe end and within the portion 5 of the bore of the union, the flat face 15 of said gasket resting against the flat face of the shoulder 6 and the peripheral portion 13 of the gasket engaging the wall of the enlarged portion 5 of the said bore.

The numeral 16 indicates a compression ring which has a flat face 17 and the opening of the ring, indicated by the numeral 18, is cylindrical for a portion of its length and of a diameter to relatively snugly fit the pipe 1, and the opening for the remainder of its length is conical or flared, as indicated by the numeral 19, to correspond to the contour of the surface 14 of the gasket 11, the other face 20 of the ring being of annular form and relatively narrow and surrounding the flared end of the opening 18. Exteriorly, the ring 16 is cylindrical and of a diameter to fit within the cylindrical enlarged portion 5 of the bore 3 of the union, and the cylindrical portion of the opening of the ring is of a diameter to snugly fit the pipe 1, and in assembling the parts the ring is fitted to the end of the pipe 1 after the gasket 11 has been arranged in the position shown in Figure 1, and with the flared portion 19 of the opening of the ring snugly contacting the beveled or conical surface 14 of the gasket.

It will be understood, of course, that ordinarily two of the unions will be employed and the threaded ends of the nipple 9 will be fitted into the enlarged threaded ends of the bores of the unions and when the parts have been assembled as shown in Figure 1 of the drawings, the unions are rotated through the medium of a wrench, thus causing the ends of the nipple 9 to exert an endwise thrust against the compression rings 16 and effect distortion of the gaskets 11 to cause the gaskets to expand inwardly against the respective pipe ends 1, this compression of the gaskets about the pipe ends being effected through the coaction of the conical walls 19 of the compression rings 16 with the conical surfaces 14 of the respective gaskets. In this manner, an exceptionally snug and fluid-tight compression of the gaskets about the pipe ends is obtained and the connection is such as to be a permanent one until the unions are purposely reversely rotated to unthread them from the nipple 9.

It will be evident that the union embodying the invention may be conveniently employed where repairs are to be made, as for example, where one of two pipe ends is broken near the coupling and where the threaded end of the other pipe is left intact, for in such a case, a bushing may be threaded onto the end of the last mentioned pipe and the union embodying the invention applied to the broken end of the first mentioned pipe and the said union then threaded onto the end of the bushing, thereby effecting coupling of the pipe ends by the employment of a single one of the bushings embodying the invention.

Having thus described the invention, what I claim is:

A pipe union of the class described comprising a body having a bore to accommodate a pipe end to be coupled, the bore having an enlarged portion providing a shoulder, a soft metal gasket having a flat face disposed against the shoulder and having its opposite face beveled, said gasket having its outer periphery initially engaged with the wall of the enlarged portion, a compression ring disposed within said enlarged portion of the bore and having its opening formed reversely with a flat face and a flared face, the latter face providing a beveled surface for coaction with the beveled face of the gasket, said enlarged portion of the bore being threaded, and a coupling nipple having its threaded end fitted into the said enlarged threaded end of the bore and having a flat terminal annulus bearing against said compression ring and when the body and nipple are threaded together, effecting movement of the ring to compress and distort the initially beveled face and said outer periphery of said gasket and effect binding of the gasket against the shoulder and wall of the bore and about the pipe end.

In testimony whereof I affix my signature.
ROSWELL G. STALLARD. [L. S.]